(12) United States Patent
Otsuka et al.

(10) Patent No.: US 9,541,178 B2
(45) Date of Patent: Jan. 10, 2017

(54) ACTUATOR

(75) Inventors: Yukiharu Otsuka, Shizuoka (JP); Katsuhito Nagai, Shizuoka (JP)

(73) Assignee: IAI CORPORATION, Shizuoka-shi, Shizuoka (JP)

( * ) Notice: Subject to any disclaimer, the term of this patent is extended or adjusted under 35 U.S.C. 154(b) by 139 days.

(21) Appl. No.: 14/358,017

(22) PCT Filed: Aug. 29, 2012

(86) PCT No.: PCT/JP2012/071756
§ 371 (c)(1),
(2), (4) Date: May 13, 2014

(87) PCT Pub. No.: WO2013/077053
PCT Pub. Date: May 30, 2013

(65) Prior Publication Data
US 2014/0305237 A1    Oct. 16, 2014

(30) Foreign Application Priority Data

Nov. 22, 2011 (JP) ................. 2011-255002
Nov. 22, 2011 (JP) ................. 2011-255009

(51) Int. Cl.
*F16H 25/20* (2006.01)
*F16J 15/16* (2006.01)
(Continued)

(52) U.S. Cl.
CPC .............. *F16H 25/20* (2013.01); *B60N 2/067* (2013.01); *F16J 15/168* (2013.01); *F16C 29/088* (2013.01); *Y10T 74/18576* (2015.01)

(58) Field of Classification Search
CPC .. F16H 25/20; F16H 25/2021; F16H 25/2418; F16H 2025/2034; F16H 57/029; F16H 57/0497; B60N 2/067; F16J 15/168; F16J 15/164; F16J 15/54; F16J 15/56; B23Q 1/26; B23Q 1/56; B23Q 1/58
See application file for complete search history.

(56) References Cited

U.S. PATENT DOCUMENTS 4,512,208 A * 4/1985 Lipinski .................. B23Q 5/40
74/566
5,170,675 A * 12/1992 Kawashima ........... B23Q 1/262
74/89.33
(Continued)

FOREIGN PATENT DOCUMENTS

JP     2005-344896 A    12/2005
JP      2005-25684 A     2/2008
WO   WO 2010/067437 A1   6/2010

OTHER PUBLICATIONS

International Search Report (ISR) (PCT Form PCT/ISA/210), in PCT/JP2012/071756, dated Oct. 16, 2012.

*Primary Examiner* — William Kelleher
*Assistant Examiner* — Jude Agendia
(74) *Attorney, Agent, or Firm* — McGinn IP Law Group, PLLC.

(57) ABSTRACT

An actuator comprises: a housing which is provided with an opening; a slider which is installed so as to be movable relative to the housing; a drive means which is installed in the housing and which moves the slider; at least a pair of seal members which is disposed at the opening of the housing so as to face each other and which exhibits dust-proof and drip-proof functions by engaging with each other; and move-through members which are mounted to both sides of the slider in the movement direction thereof and which move through the pair of seal members. The move-through members each comprise: a move-through section which pushes apart the pair of seal members in the direction in which the pair is separated; a cover section which covers an expanded opening formed between the pair of seal members when the (Continued)

pair is pushed apart by the move-through section; and an opening restriction section which, when the pair of seal members is pushed apart from each other by the move-through section, restricts the amount of opening between the pair of seal members and in turn restricts the size of the expanded opening.

12 Claims, 14 Drawing Sheets

(51) Int. Cl.
*B60N 2/06* (2006.01)
*F16C 29/08* (2006.01)

(56) References Cited

U.S. PATENT DOCUMENTS

| | | | | |
|---|---|---|---|---|
| 5,749,266 A * | 5/1998 | Tsukada | ............. | F16C 29/0642 384/13 |
| 6,000,292 A * | 12/1999 | Nagai | ............. | B23Q 1/26 277/634 |
| 6,098,521 A * | 8/2000 | Iida | ............. | B23Q 1/26 92/129 |
| 6,240,796 B1 * | 6/2001 | Yamada | ............. | B23Q 1/0063 74/89.23 |
| 6,344,718 B1 * | 2/2002 | Nagai | ............. | B23Q 1/58 310/80 |
| 6,662,934 B1 * | 12/2003 | Iida | ............. | B23Q 1/58 198/621.1 |
| 6,749,057 B2 * | 6/2004 | Kato | ............. | B23Q 1/58 198/750.1 |
| 7,066,649 B2 * | 6/2006 | Nagai | ............. | B23Q 11/08 277/410 |
| 7,448,311 B2 * | 11/2008 | Naruse | ............. | F15B 15/082 92/165 R |
| 7,562,595 B2 * | 7/2009 | Kato | ............. | F16C 29/08 198/494 |
| 8,925,408 B2 * | 1/2015 | Sakai | ............. | F16H 25/2204 74/89.33 |
| 2005/0257633 A1 * | 11/2005 | Yamagishi | ............. | F16H 25/20 74/89.33 |
| 2013/0174679 A1 * | 7/2013 | Fukano | ............. | F16H 25/20 74/89.34 |

* cited by examiner

ACTUATOR

TECHNICAL FIELD

The present invention relates to an actuator having dust-proof and drip-proof structures, and more particularly, relates to that having a structure to move a slider by moving through seal members, in which, by providing opening restriction sections to restrict the amount of opening of the seal members, and further restricts the size of expanded openings during moving-through, the sealing performance can be improved.

BACKGROUND ART

Patent Document 1 shows an example of actuator having dust-proof and drip-proof structures according to a conventional art.

The actuator is provided with a housing formed in a substantially U-shaped shape and having an opening, a drive means installed in the housing, a slider which is movable relative to the housing and driven by the drive means, a drive means cover disposed to close the opening of the housing from the upper surface direction and from the both right and left side surface directions, and a dust/drip seal means disposed between the housing and the drive means cover.

The dust/drip seal means has a structure of two-stage stacked seals, with a labyrinth structure by overlaying side covers of the housing with side covers of the drive means cover.

The movement of the slider is performed by moving through the seals by seal move-through members.

REFERENCE DOCUMENTS OF CONVENTIONAL ART

Patent Document(s)

Patent Document 1: Official Gazette of Japanese Unexamined Patent Publication No. 2005-344896.

SUMMARY OF THE INVENTION

Problems to be Solved by Invention

The structure of the conventional art has the following problems.

For example, according to the actuator described in the Patent Document 1, while the slider is moving, the seal move-through members move through the seals. At that time, the move-through action expands the seal openings too wide (in particular, the opening expands widely in the forward part of the movement direction), which causes the deterioration of sealing performance.

For reference, according to the conventional art, in order to solve the above problem, the two-stage stacked seals are provided, but the problem has not been solved sufficiently.

In the light of the above problem, it is an object of the present invention to provide an actuator, in which, by minimizing the amount of opening of the seal members, and in turn by minimizing the size of expanded openings during moving-through, the sealing performance can be improved.

Means to Solve the Problem

To achieve the objects mentioned above, an actuator according to claim 1 is comprising: a housing which is provided with an opening; a slider which is installed so as to be movable relative to the housing; a drive means which is installed in the housing and which moves the slider; at least a pair of seal members which is disposed at the opening of the housing so as to face each other and which exhibits dust-proof and drip-proof functions by engaging with each other; and seal move-through members which are mounted to both sides of the slider in the movement direction thereof and which move through the pair of seal members, wherein, the seal move-through members each comprising: a move-through section which pushes apart the pair of seal members in the direction in which the pair of seal member is separated; a cover section which covers an expanded opening formed between the pair of seal members when the pair of seal members is pushed apart by the move-through section; and an opening restriction section which, when the pair of seal members is pushed apart from each other by the move-through section, restricts the amount of opening between the pair of seal members and further restricts the size of the expanded opening.

Further, according an actuator of claim 2, with regard to the actuator of claim 1, a pair of opening restriction surfaces facing each other is formed in the opening restriction section, and distance of the pair of opening restriction surfaces becomes closer to each other as the pair of opening restriction surfaces goes closer to a front end of the move-through section.

Further, according to an actuator of claim 3, with reference to the actuator of claim 2, a pair of seal guides, which guides the pair of seal members, is disposed at the cover section.

Further, according to an actuator of claim 4, with reference to the actuator of claim 3, the front end of the move-through section is in a shape of a bow of a ship.

Further, according to an actuator of claim 5, with reference to the actuator of claim 4, the side of the housing facing a working space is closed, and the side of the housing facing a mounting surface is the opening.

Further, according to an actuator of claim 6, with reference to the actuator of claim 5, the slider is projectingly disposed so as to straddle over the housing.

Further, according to an actuator of claim 7, with reference to the actuator of claim 5, a lid is provided at the center of the opening of the housing.

And further, according to an actuator of claim 8, with reference to the actuator of claim 7, gaps are formed, respectively, between the both right and left sides of the lid and the housing, and the pair of seal members is disposed in the respective gaps.

Effect of the Invention

As discussed above, the actuator according to claim 1 is comprising: the housing which is provided with the opening; the slider which is installed so as to be movable relative to the housing; the drive means which is installed in the housing and which moves the slider; at least the pair of seal members which is disposed at the opening of the housing so as to face each other and which exhibits dust-proof and drip-proof functions by engaging with each other; and the seal move-through members which are mounted to both sides of the slider in the movement direction thereof and which move through the pair of seal members, wherein, the seal move-through members each comprising: the move-through section which pushes apart the pair of seal members in the direction in which the pair of seal member is separated; the cover section which covers the expanded opening formed between the pair of seal members when the pair of seal members is pushed apart by the move-through section; and the opening restriction section which, when the pair of seal members is pushed apart from each other by the move-through section, restricts the amount of opening between the pair of seal members and further restricts the size of the expanded opening. Therefore, the size of the expanded opening can be minimized by the opening restriction section, and at the same time, the expanded opening is covered by the cover section, and accordingly, the actuator provided with desired dust-proof and drip-proof structures can be obtained with a simple structure.

Further, according the actuator of claim 2, with regard to the actuator of claim 1, the pair of opening restriction surfaces facing each other is formed in the opening restriction section, and the distance of the pair of opening restriction surfaces becomes closer to each other as the pair of opening restriction surfaces goes closer to the front end of the move-through section. Therefore, the opening restriction section can restrict the amount of opening of the pair of seal members more effectively.

Further, according to the actuator of claim 3, with reference to the actuator of claim 2, the pair of seal guides, which guides the pair of seal members, is disposed at the cover section. Therefore, the pair of seal members, which is moved through by the move-through section, can be restricted not to be apart from each other for more than a predetermined distance, whereby the sealing performance can be improved.

Further, according to the actuator of claim 4, the front end of the move-through section is in a shape of a bow of a ship. Therefore, as seen from the positional relation, the bow-shaped move-through section exists in the in-the-housing-side of the expanded opening, whereby the sealing performance can be improved. In addition, when the bow-shaped move-through section moves through the pair of seal members, the pair of seal members is pushed apart from the inner part, and accordingly, the smooth move-through action, and further the smooth movement of the slider, can be accomplished.

Further, according to the actuator of claim 5, the side of the housing facing a working space is closed, and the side of the housing facing a mounting surface is the opening. Therefore, the possibility of intrusion of foreign articles coming from the outside, and the possibility of flow-out of dust, etc., to the outside, caused in the inside, via the opening, can be reduced. Thus, by simply closing the side facing the working space, and also by making the side facing the mounting surface as the opening, the sealing performance can be improved.

Further, according to the actuator of claim 6, with reference to the actuator of claim 5, the slider is projectingly disposed so as to straddle over the housing. Therefore, carrying articles can be placed and fixed on the side facing the working space which is opposite to the side facing the mounting surface, and at the same time, the slider prevents the intrusion of foreign articles coming from the outside, and also prevents the flow-out of dust, etc., to the outside, caused in the inside, via the opening.

Further, according to the actuator of claim 7, with reference to the actuator of claim 5, the lid is provided at the center of the opening of the housing. Therefore, size of the opening can be minimized corresponding to the size of the lid, and accordingly, the intrusion of foreign articles coming from the outside, and the flow-out of dust, etc., to the outside, caused in the inside, can be prevented.

And further, according to the actuator of claim 8, with reference to the actuator of claim 7, the gaps are formed, respectively, between the both right and left sides of the lid and the housing, and the pair of seal members is disposed in the respective gaps. Therefore, the intrusion of foreign articles coming from the outside, and the flow-out of dust, etc., to the outside, caused in the inside, can be prevented.

MODE(S) FOR CARRYING OUT THE INVENTION

A structure of an actuator according to a first embodiment of the present invention will now be discussed with reference to FIG. 1 through FIG. 13.

Figure 2:
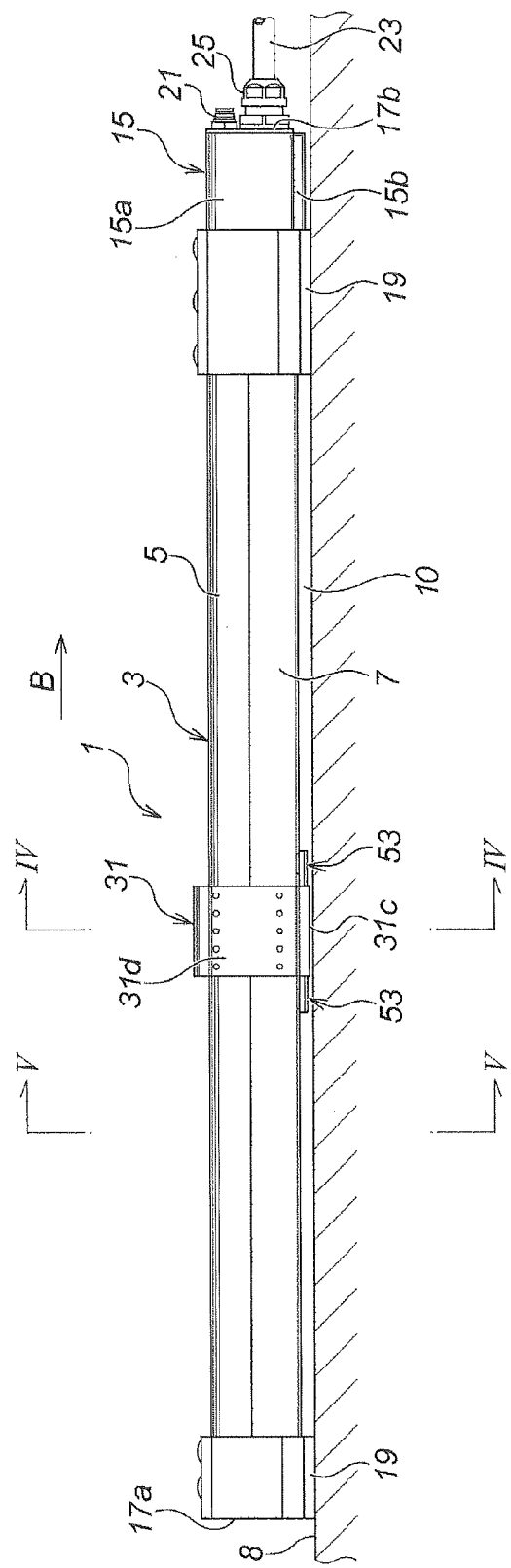
FIG. 2 A side view of the actuator according to the first embodiment of the present invention.
Figure 3:
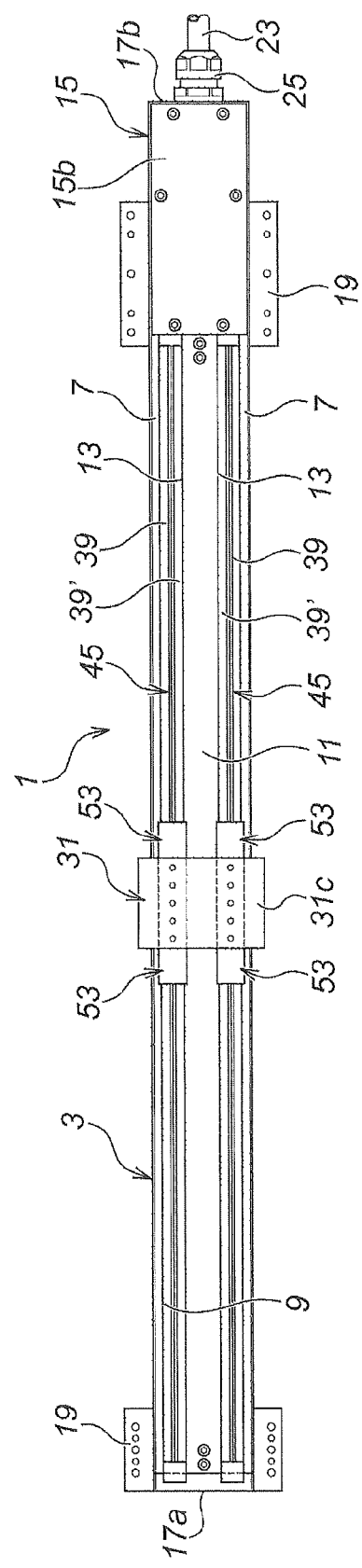
FIG. 3 A bottom view of the actuator according to the first embodiment of the present invention.
Figure 4:
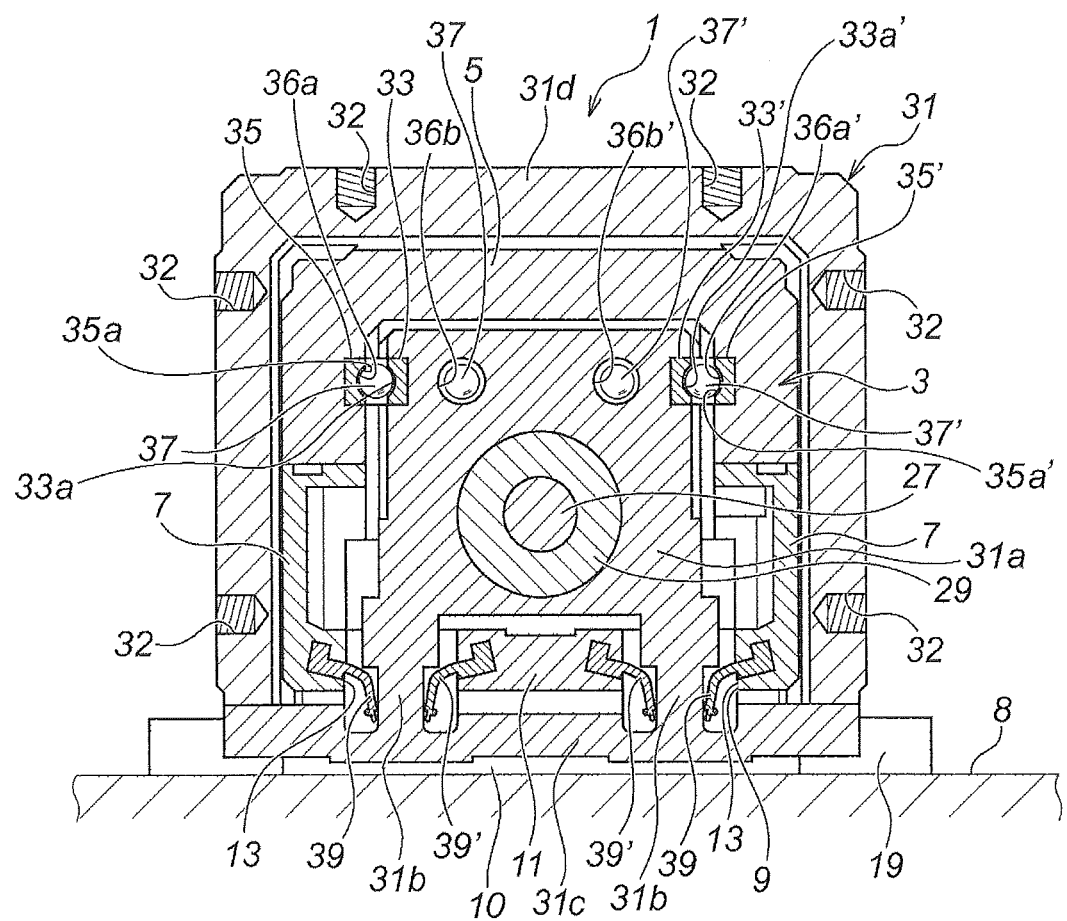
FIG. 4 A sectional view as seen from the line IV-IV of FIG. 2, according to the first embodiment of the present invention.
Figure 5:
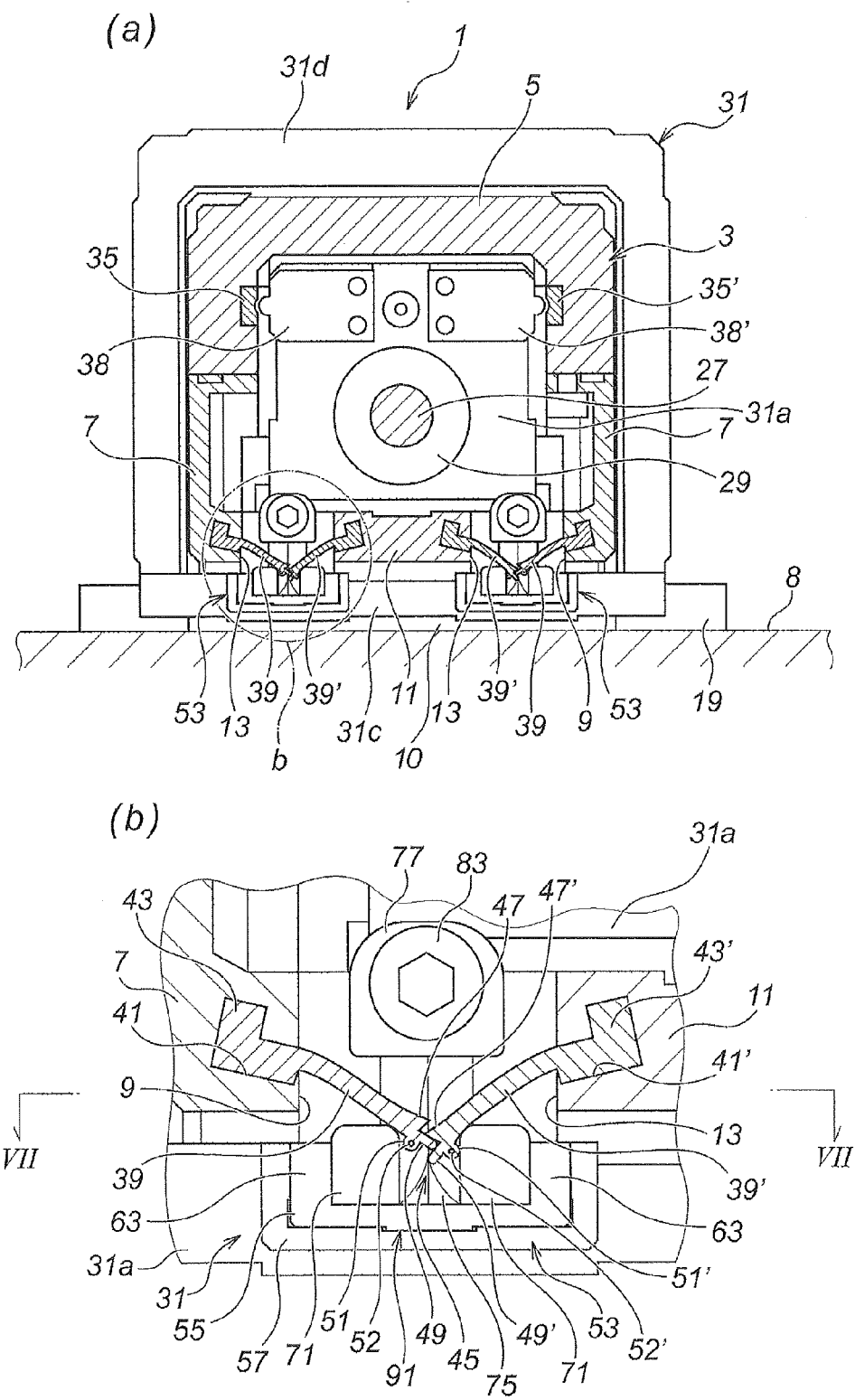
FIG. 5 Drawings according to the first embodiment of the present invention, in which, FIG. 5 (a) is a sectional view as seen from the line V-V of FIG. 2, and FIG. 5 (b) is an expanded view of the part b of FIG. 5 (a)

An actuator 1 according to the present embodiment has the structure as illustrated in FIG. 1 through FIG. 6. There is a housing 3, and as illustrated in FIG. 4 and FIG. 5, the sectional shape of this housing 3 is substantially a reversed U-shape. Specifically, the housing 3 is formed by an upper frame 5, and by a pair of side frames 7, 7 disposed on the both right and left sides of the upper frame 5. Further, the lower part of the housing 3 as seen in FIG. 4, namely the side facing a mounting surface 8, serves as an opening 9.

For reference, the side frames 7, 7 are fixed on the upper frame 5 by unillustrated fastening bolts.

Moreover, as illustrated in FIG. 3, a lid 11 is disposed at the center in the width direction of the opening 9 of the housing 3 (at the center in the upward/downward direction of FIG. 3), and this lid 11 is elongating and disposed along the longitudinal direction of the housing 3 (the rightward/leftward direction of FIG. 3). Moreover, as illustrated in FIG. 3 and FIG. 4, between the pair of side frames 7, 7 and the lid 11, gaps 13, 13 are formed to be elongating, respectively, in the longitudinal direction of the housing 3.

For reference, when the actuator 1 is installed, the gaps 13, 13 face toward the mounting surface 8 (the lower part of the FIG. 4), and the other part of the housing 3, that is the part on the side facing a working space (the upper part of FIG. 4) is closed completely.

Moreover, as illustrated in FIG. 2 and FIG. 3, a motor cover 15 is connected to the rear end side of the housing 3 in the longitudinal direction (the right end of FIG. 2). The motor cover 15 is composed of an upper motor cover 15a in a reversed U-shape, which covers the side facing the working space (the upper part of FIG. 2), and a lower motor cover 15b, which closes the side facing the mounting surface 8 (the lower part of FIG. 2).

Moreover, the front end of the housing 3 in the longitudinal direction (the left end of FIG. 3) is closed by an end cap 17a, and the rear end of the motor cover 15 in the longitudinal direction (the right end of FIG. 3) is closed by an end cover 17b.

Figure 1:
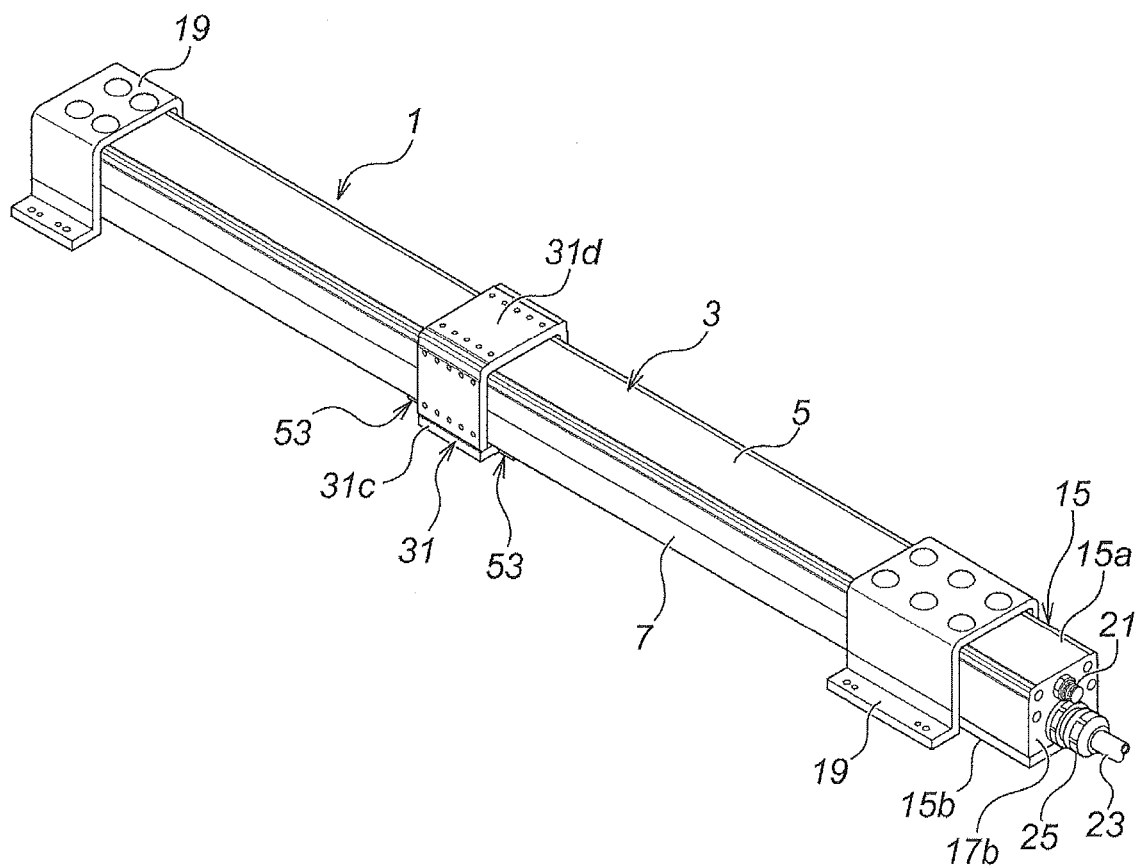
FIG. 1 A perspective view of an actuator according to a first embodiment of the present invention.

Moreover, as illustrated in FIG. 1 and FIG. 2, legs 19, 19 are provided, respectively, at the each end of the housing 3 in the longitudinal direction (the rightward/leftward direction of FIG. 2). With these legs 19, 19, the housing 3 secures a space 10 on the side facing the mounting surface 8 (the downward direction side of FIG. 2), whereby the movement of a slider 31, which will be discussed afterwards, is guaranteed.

Moreover, as illustrated in FIG. 1 and FIG. 2, a control cable connector 21 and a power supply cable connector 25 are provided, respectively, at the rear end of the actuator 1 (the right side of FIG. 2). An unillustrated control cable, which is used for controlling of the actuator 1, is connected to the control cable connector 21. Moreover, a power supply cable 23, which supplies electric power to the actuator 1, is connected to the power supply cable connector 25.

Figure 6:
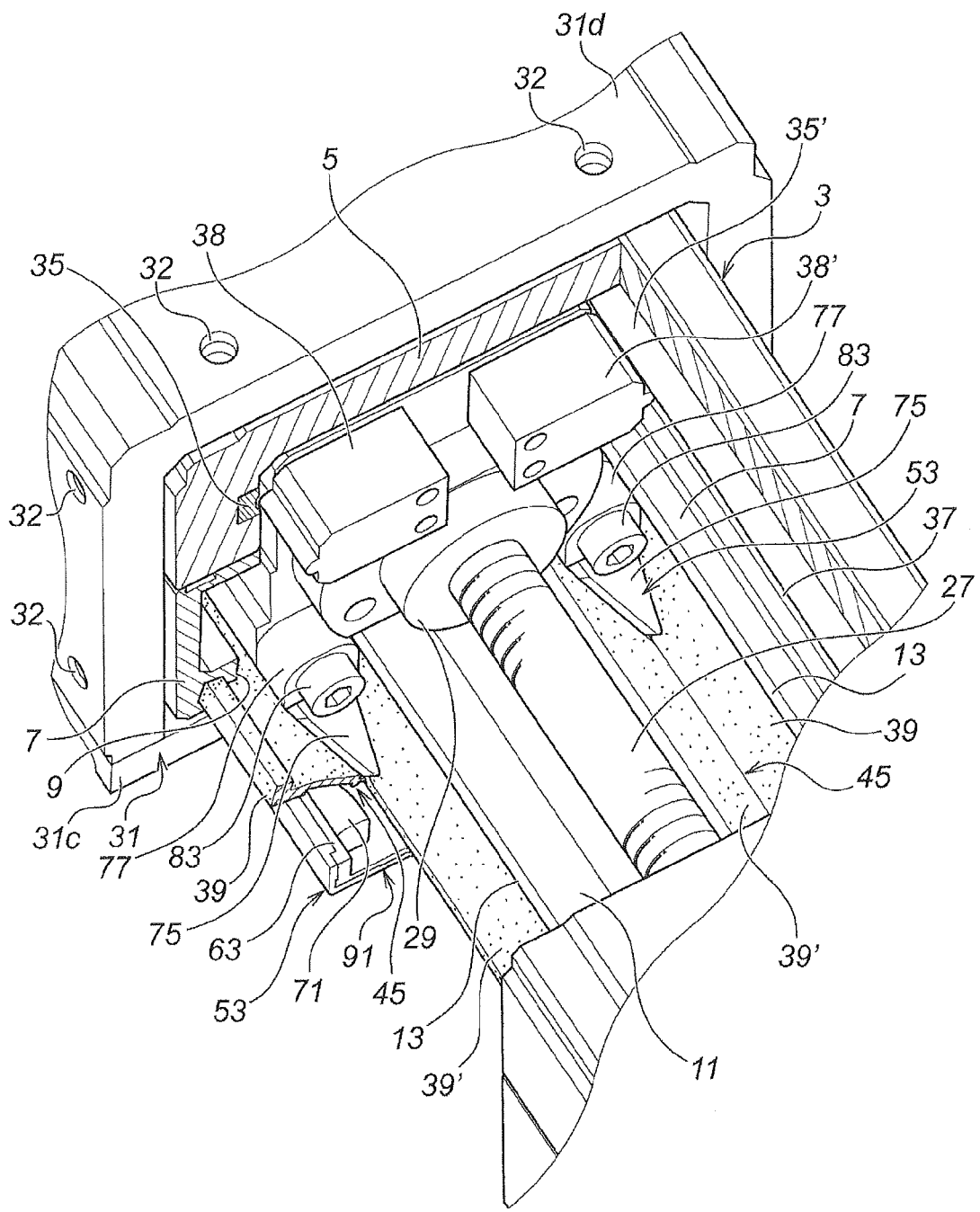
FIG. 6 An expanded perspective view showing a part in the vicinity of seal move-through members of the actuator according to the present invention, in which a housing, rails and seal members are partially removed.

Moreover, an unillustrated motor is installed in the inside of the motor cover 15. And as illustrated in FIG. 4 through FIG. 6, a ball screw 27, which is connected to a rotation shaft of the motor via a coupling mechanism (not illustrated), is accommodated and disposed in the inside of the housing 3.

A ball nut 29 is screwed into the ball screw 27. The ball nut 29 has the slider 31 fixed thereon. As illustrated in FIG. 4, the slider 31 is projectingly disposed so as to straddle over the surfaces on the side of the housing 3 facing the working space (the space in the upper part of FIG. 4), via gaps 13, 13 as discussed above. Specifically, the slider 31 is composed of a slider main body 31a fixed to the ball nut 29, gap penetrating sections 31b, 31b, respectively elongating in the downward direction of FIG. 4 from the slider main body 31a and penetrating through the gaps 13, 13, a bottom section 31c disposed in the lower part of the gap penetrating sections 31b, 31b as shown in FIG. 4, and a table 31d which is fixed on the bottom section 31c and is formed substantially in a reverse U-shape so as to straddle over the surfaces on the side of the housing 3 facing the working space (the space in the upper part of FIG. 4).

The surfaces of the slider 31 on the side facing the working space (the upper surface, and both the right and left side surfaces of FIG. 4), namely the table 31d, accepts unillustrated various carrying articles to be placed and fixed, corresponding to the purpose of the actuator 1.

Further, each reference numeral 32 of FIG. 4 shows a screw hole formed in the slider 31, which is used for placing and fixing of the unillustrated carrying articles on the slider 31.

As illustrated in FIG. 4, in the inside of the housing 3, rails 33, 33' are disposed at the both ends in the width direction (the both ends in the rightward/leftward direction of FIG. 4) of the upper part of the slider main body 31a (the upper part of FIG. 4), and grooves 33a, 33a', each of which forming a substantially semicircular cross-sectional shape, are formed therein respectively. On the other hand, rails 35, 35' are disposed facing each other in the inner peripheral surface of the upper frame 5, so as to face the rails 33, 33', respectively. Grooves 35a, 35a', each of which forming a substantially semicircular cross-sectional shape, are also formed respectively in the rails 35, 35'. The rails 33, 33' are disposed over the whole length of the slider main body 31a, and the rails 35, 35' are also disposed over the whole length of the housing 3.

A ball circulation path 36a is formed between the rail 33 and the rail 35. Similarly, a ball circulation path 36a' is formed between the rail 33' and the rail 35'. Moreover, ball circulation paths 36b, 36b' are formed, respectively, in the slider main body 31a.

Moreover, as illustrated in FIG. 5 (a) and FIG. 6, end caps 38, 38' are attached, respectively, to the both end surfaces of the movement directions (the both end surfaces in the direction perpendicular to the drawing sheet surface of FIG. 5 (a)) of the slider main body 31a. An unillustrated ball return path communicating the ball circulation path 36a with the ball circulation path 36b, and an unillustrated ball return path communicating the ball circulation path 36a' with the ball circulation path 36b', are formed respectively in these end caps 38, 38'.

Consequently, a plurality of balls 37 circulates along the ball circulation path 36a, the ball circulation path 36b, and the unillustrated ball return paths in the end caps 38, 38 on the both sides. Similarly, a plurality of balls 37' circulate along the ball circulation path 36a', the ball circulation path 36b', and the unillustrated ball return paths in the end caps 38', 38' on the both sides.

The rails 33, 33', 35, 35', and the balls 37, 37' are made of steel. Moreover, the ball screw 27 and the ball nut 29 are also made of steel. On the other hand, the structural members, other than the rails 33, 33', 35, 35', and the balls 37, 37', as well as the ball screw 27 and the ball nut 29, are made of aluminum.

The material of each member is merely explained as an example.

The above is the overall structure of the actuator according to the present embodiment.

Next, the structure for the sealing, disposed in the gaps 13, 13 as discussed above, will be explained in detail, with reference to FIG. 5 through FIG. 13.

With reference to the gaps 13, 13, when the one gap 13 is seen, as illustrated in FIG. 5 (b), seal members 39, 39' are disposed, respectively, at the marginal sections thereof facing each other in the width direction (the rightward/leftward direction of FIG. 5 (b)). The seal member 39 is attached to the toe of the side frame 7 of the housing 3. Specifically, a groove 41 in a predetermined shape is formed at the toe part of the side frame 7, and by press fitting of a base end section 43 of the seal member 39 into the groove 41, the seal member 39 is fixed in the side frame 7. Further, the seal member 39 is elongating inward (toward the right side of FIG. 5 (*b*)) and at the same time obliquely downward (toward the lower side of FIG. 5 (*b*)) from the side of the side frame 7.

On the other side, the seal member 39' is attached to the lid 11. Specifically, a groove 41' in a predetermined shape is formed at the side end part of the lid 11, and by press fitting of a base end section 43' of the seal member 39' into the groove 41', the seal member 39' is fixed in the side lid 11. Further, the seal member 39' is elongating outward (toward the left side of FIG. 5 (*b*)) and at the same time obliquely downward (toward the lower side of FIG. 5 (*b*)) from the side of the lid 11.

For reference, the elements of the seal member 39' which are the same as those of the seal member 39 are expressed by adding an apostrophe (') to the same reference numerals.

Moreover, as illustrated in FIG. 5 (*a*), with reference to the gaps 13, 13, the same structure is applied to the other gap 13, and the seal members 39, 39' are attached, respectively, to the marginal sections thereof facing each other in the width direction (the rightward/leftward direction of FIG. 5 (*a*)).

For reference, the same reference numerals are allotted to the same sections in the drawings, and the explanation thereof will be omitted.

Further, as illustrated in FIG. 5 (*b*), the top ends of the seal members 39, 39' are engaging with each other to constitute a seal section 45. The seal section 45 prevents foreign articles from intruding into the inside of the housing 3, and also prevents dust, etc., caused in the inside, from flowing out to the outside.

Next, the structure of the seal member 45 will be explained more in detail. As illustrated in FIG. 5 (*b*), an upper engagement projection 47 in a substantially triangular cross-sectional shape, is formed to be projecting from the upper surface side (the upper part of FIG. 5 (*b*)) at the top end (the center part of FIG. 5 (*b*)) of the seal member 39. Further, a top end section 49 is disposed at the top end of the seal member 39. In addition, a lower projection 51 is formed on the lower surface side (the lower part of FIG. 5 (*b*)) at the top end (the center part of FIG. 5 (*b*)) of the seal member 39. A thread 52 is embedded in the lower projection 51, along the longitudinal direction of the seal member 39 (the direction perpendicular to the drawing sheet surface of FIG. 5). For example, the seal member 39 is made of synthetic resin such as urethane, and since the thread 52 is embedded therein, the appropriate elastic deformation can be performed.

For example, any material using aramid fiber may be utilized as the thread 52, and such material is advantageous from the viewpoints of tensile strength, elastic modulus and heat resistance. Specifically, "Kevlar (registered trademark)" of Du Pont, USA, may be mentioned.

On the other hand, the seal member 39' has the same structure as that of the seal member 39, and therefore, the same elements are expressed by adding an apostrophe (') to the same reference numerals, and the explanation thereof will be omitted.

Further, in a normal state, the seal members 39, 39' are elastically deformed by a predetermined amount, and the top end section 49 of the seal member 39 is engaged with the upper engagement projection 47' of the seal member 39', and accordingly, a desired sealing function can be obtained. In particular, with the elastic return force of the seal members 39, 39', the top end section 49 of the seal member 39 is in a state of being pressed down by the upper engagement projection 47' of the seal member 39', and therefore the seal function with high reliability can be obtained.

Figure 7:
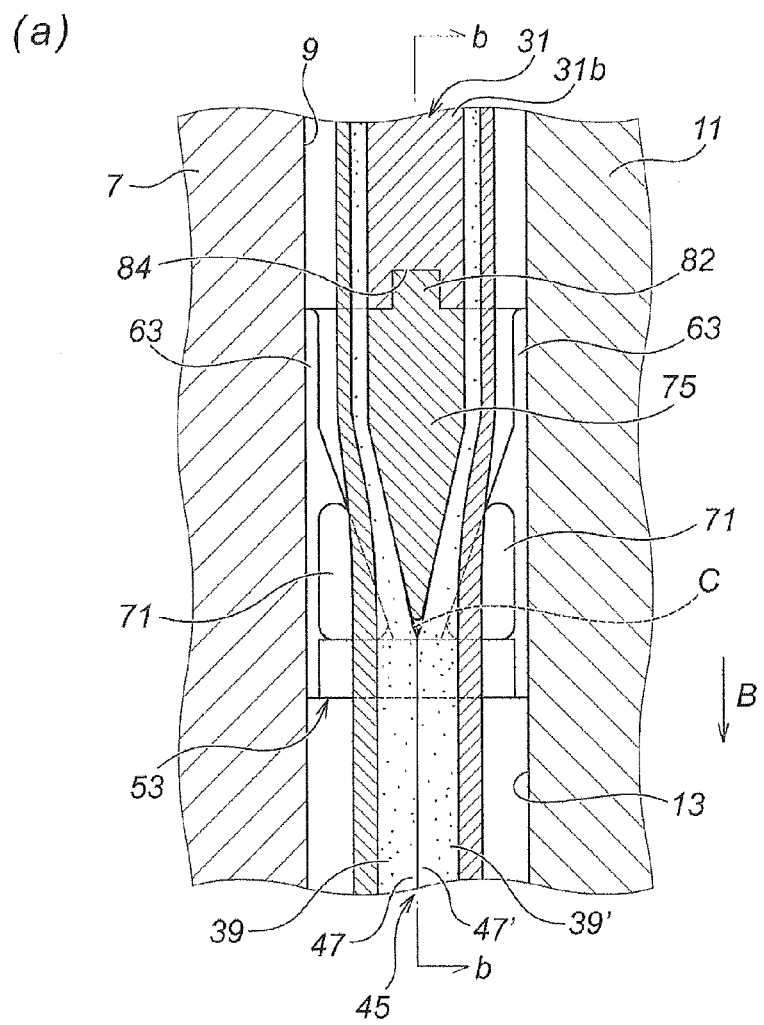
FIG. 7 Drawings according to the first embodiment of the present invention, in which, FIG. 7 (a) is a sectional view as seen from the line VII-VII of FIG. 5 (b), and FIG. 7 (b) is a sectional view as seen from the line b-b of FIG. 7 (a)
Figure 7:
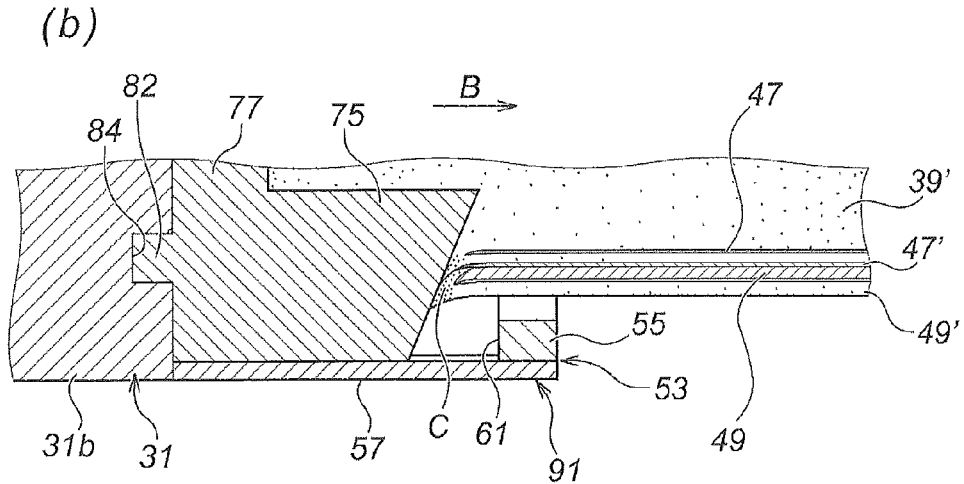
Figure 8:
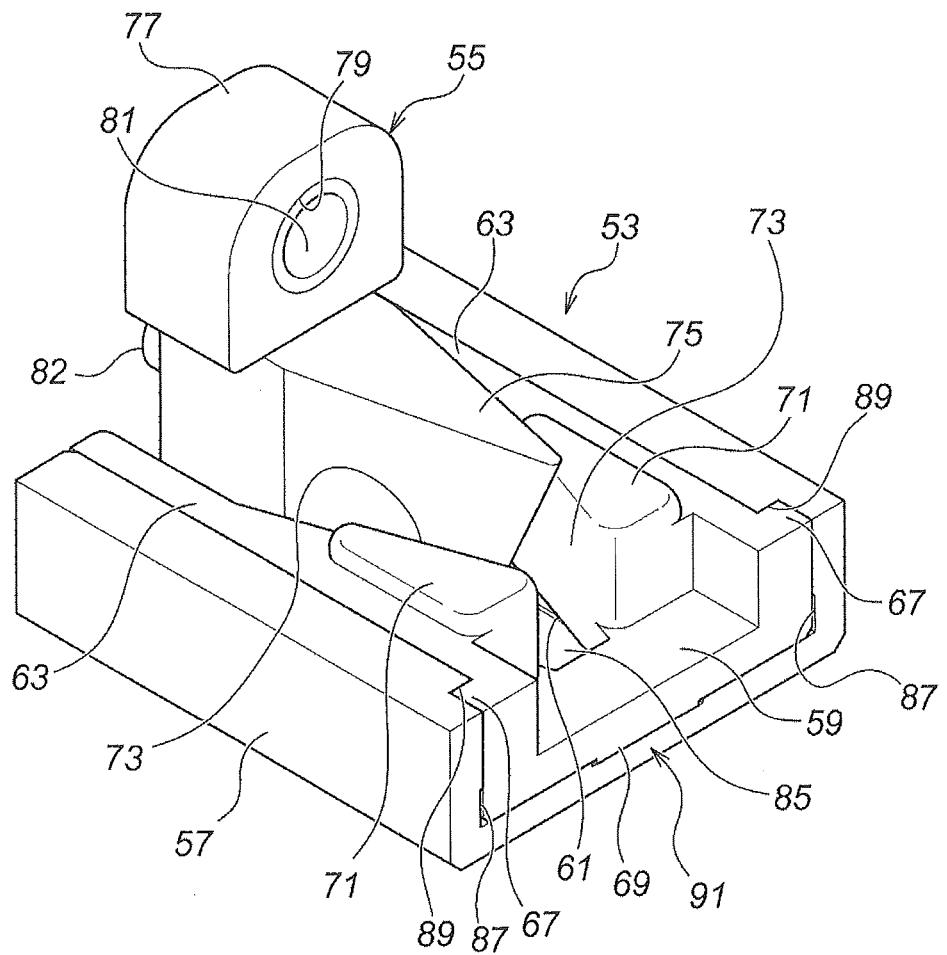
FIG. 8 A perspective view showing the seal move-through member used for the actuator according to the first embodiment of the present invention.
Figure 9:
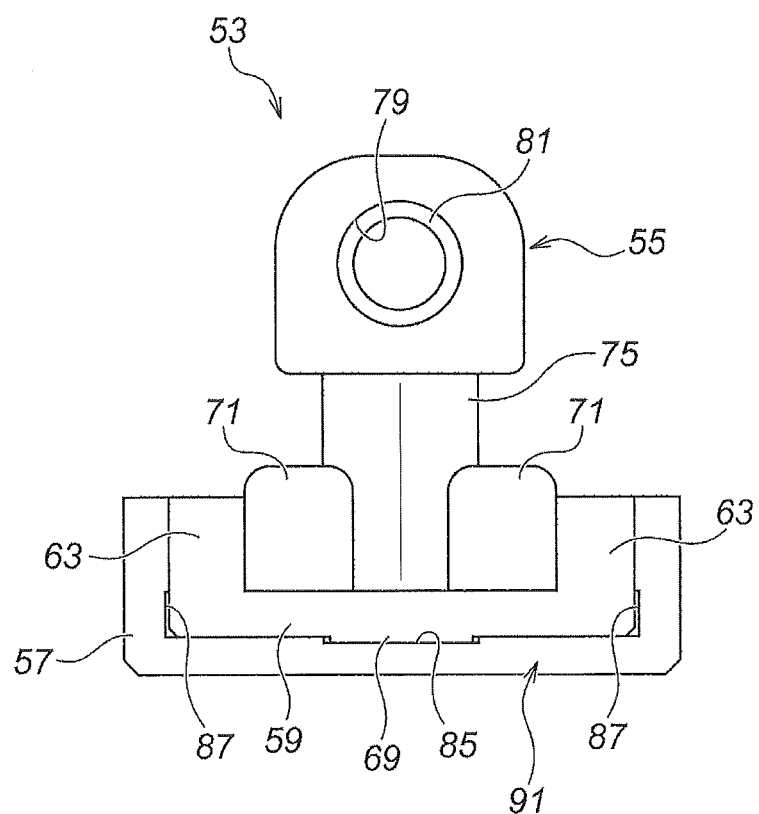
FIG. 9 A front view showing the seal move-through member used for the actuator according to the first embodiment of the present invention.
Figure 10:
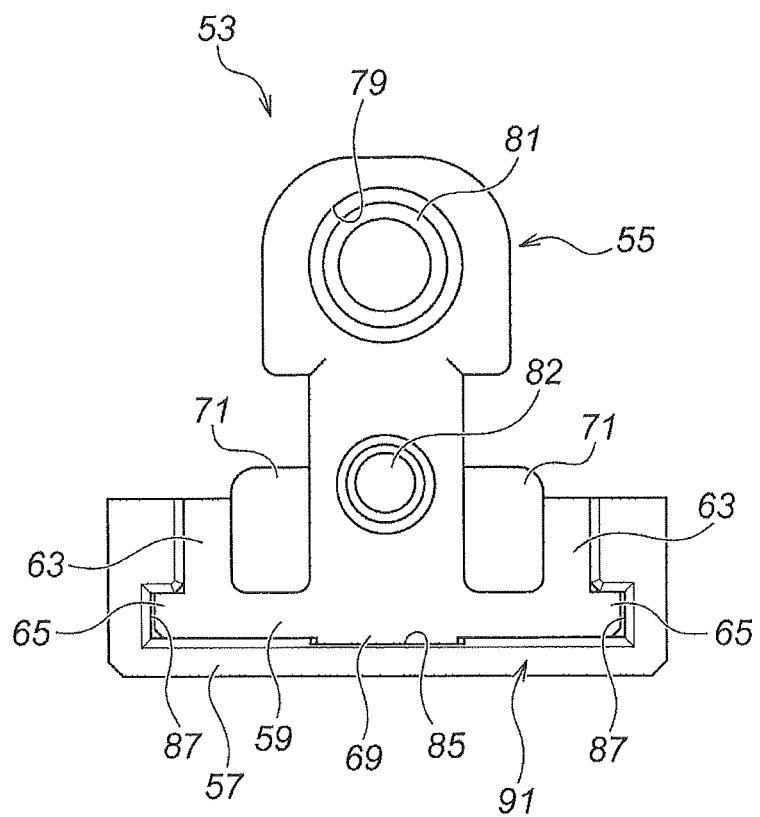
FIG. 10 A rear view showing the seal move-through member used for the actuator according to the first embodiment of the present invention.

Moreover, as illustrated in FIG. 3, a pair of seal move-through members 53, 53 is disposed, one by one on the right and left, at the both ends in the movement direction (at the both ends in the rightward/leftward direction of FIG. 3), on the side of the slider 31 facing the mounting surface 8. The seal move-through member 53 is made of, for example, synthetic resin such as engineering plastic, or metal, and as illustrated in FIG. 8 through FIG. 10, is constituted by assembling a seal move-through member main body 55 and a cover member 57. As illustrated in FIG. 4 through FIG. 7, the seal move-through member 53 is positioned between the seal members 39, 39' of the seal section 45, and exhibits the function of moving through the engaging part of the seal members 39, 39', while the slider 31 is in motion.

Figure 11:
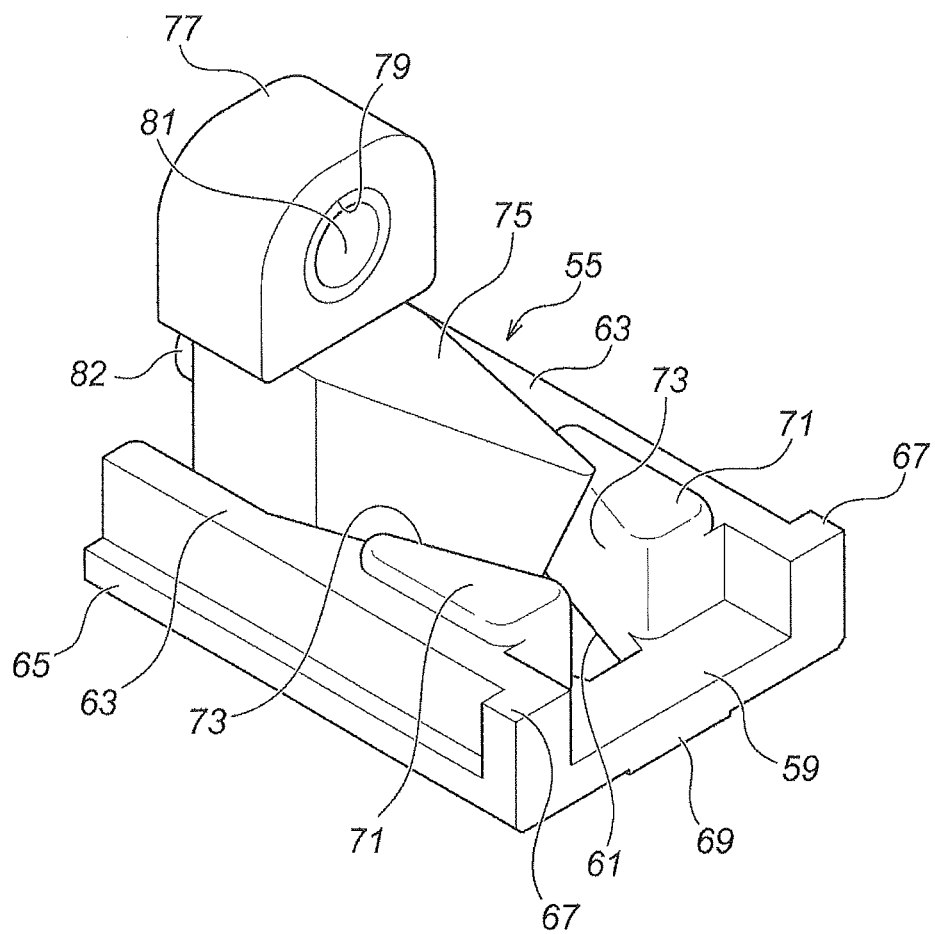
FIG. 11 A perspective view showing a seal move-through member main body of the seal move-through member used for the actuator according to the first embodiment of the present invention.
Figure 12:
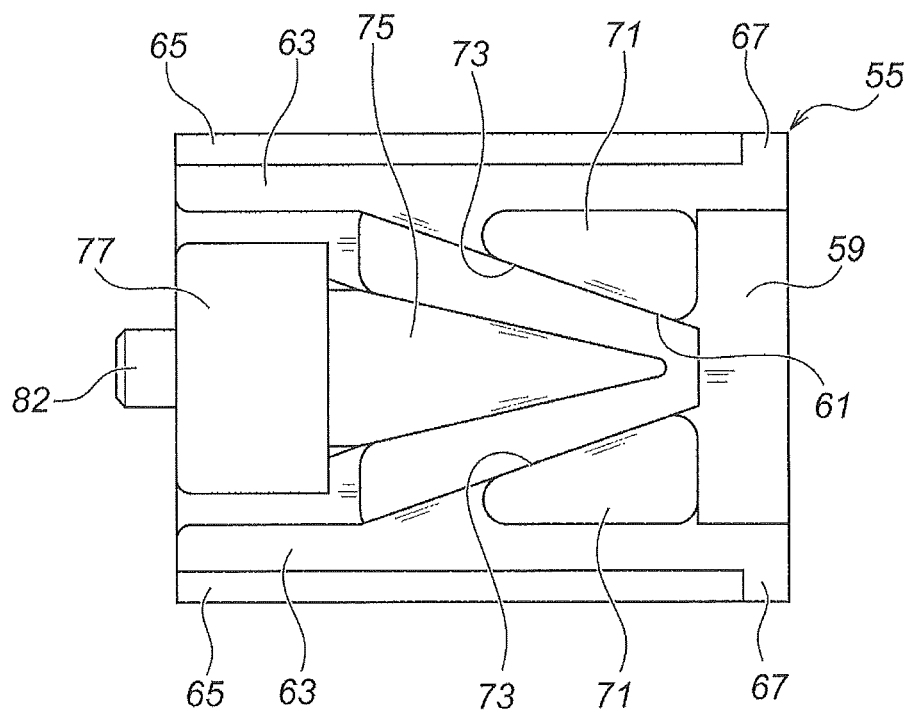
FIG. 12 A plan view showing the seal move-through member main body of the seal move-through member used for the actuator according to the first embodiment of the present invention.

The seal move-through member main body 55 has a structure as illustrated in FIG. 11 and FIG. 12. There is a bottom section 59, and an opening 61 in a substantially V-shape is formed in the bottom section 59. The opening 61 is formed due to the manufacturing reason such as injection molding or machining. In the case of the present embodiment, the cover member 57 is attached thereto in order to close such an opening 61.

For reference, where the seal move-through member main body 55 can be formed without providing such an opening 61 as discussed above, the cover member 57 will not be required.

Moreover, seal guides 63, 63 stand, respectively, on the both ends in the width direction of the bottom section 59 (the upward/downward direction of FIG. 12), formed to be elongating in the longitudinal direction (the rightward/leftward direction of FIG. 12). The outer sides of the seal guides 63, 63 of the bottom section 59 (the upper side or the lower side of FIG. 12) serve, respectively, as engagement projections 65. 65. Moreover, stoppers 67, 67 are formed to be projecting outward (the upward or downward direction of FIG. 12) from the front ends of the seal guides 63, 63 (the right end of FIG. 12). Moreover, an engagement projection 69 is formed to be projecting from the lower surface of the bottom section 59 (the lower side of FIG. 11) over the whole length.

Moreover, opening restriction sections 71, 71 are formed, respectively, between the seal guides 63, 63 and on the side of the front end thereof (the right side of FIG. 12). As illustrated in FIG. 12, etc., the cross-sectional shape of the opening restriction sections 71, 71 is substantially a right-angled triangle. Moreover, opening restriction surfaces 73, 73 are formed, respectively, on the opening restriction sections 71, 71, in a state that the distance therebetween becomes smaller to each other as they go closer to the front part of the seal move-through member 53 (the right side of FIG. 12), that is, to the front end of a bow-shaped move-through section 75, which will be discussed afterwards. With this structure, the amount of opening of the seal members 39, 39', which are moved through by the seal move-through member 53, is restricted.

Moreover, the bow-shaped move-through section 75 is disposed in the seal move-through member main body 55. With reference to FIG. 7 (*b*), as the part of the bow-shaped move-through section 75 goes upward, the bulging volume thereof toward the right side of FIG. 7 (*b*) becomes larger.

As already explained, with regard to the seal members 39, 39', which have been moved through by the bow-shaped move-through section 75, the amount of opening thereof is restricted by the opening restriction sections 71, 71, and at the same time, the distance therebetween is restricted by the seal guides 63, 63 so as not to be apart from each other for more than a predetermined value.

Moreover, a mounting section 77 is disposed on the upper surface of the seal move-through member main body 55 (the end surface in the upper part of FIG. 11). A penetration hole 79 is perforated in the mounting section 77, and a collar 81 is accommodated in the penetration hole 79. Moreover, an engagement projection 82 is formed to be projecting from the rear end side of the mounting section 77 (the left side of FIG. 11). Accordingly, as illustrated in FIG. 6, the seal move-through member main body 55, and further the seal move-through member 53, is fixed on the slider 31, by screwing a bolt 83, which is penetrating through the collar 81, into the slider main body 31a. At that time, as illustrated in FIG. 7 (a) and FIG. 7 (b), the engagement projection 82 is engaged with an engagement recess 84 formed in the slider main body 31a.

Figure 13:
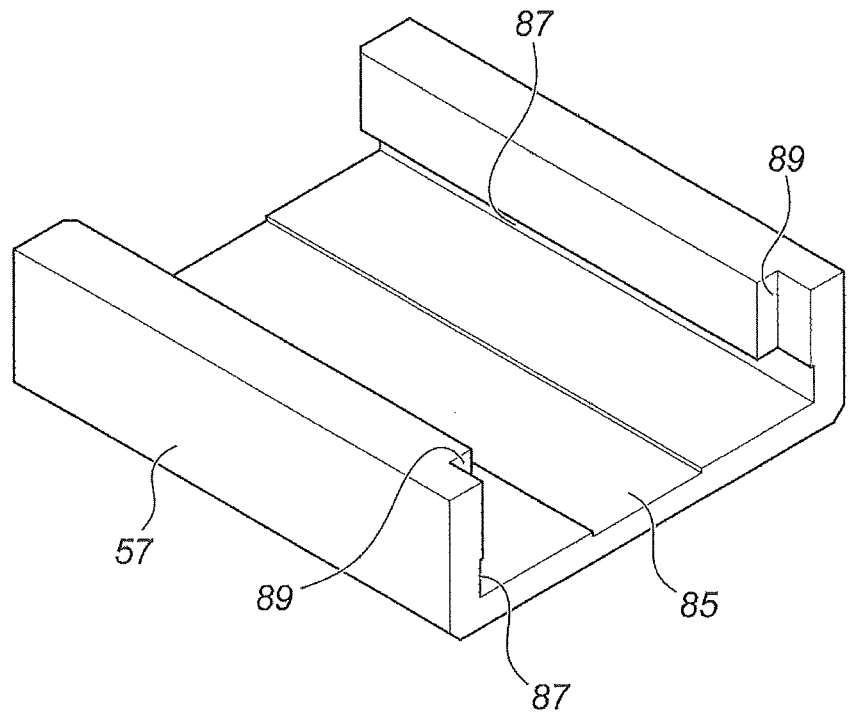
FIG. 13 A plan view showing a cover section of the seal move-through member used for the actuator according to the first embodiment of the present invention.

As illustrated in FIG. 13, the cover member 57 is a member, of which cross-sectional shape is substantially a U-shape. An engagement groove 85 is formed in the center of the bottom on the inner side of the cover member 57, elongating in the longitudinal direction thereof (the rightward/leftward direction of FIG. 13). Moreover, engagement grooves 87, 87 are formed, respectively, in the bottom part of the both side surfaces on the inner side of the cover member 57, elongating in the longitudinal direction thereof (the rightward/leftward direction of FIG. 13). Moreover, cutouts 89, 89 are formed, respectively, on the front end surfaces of the cover member 57 (the right side of FIG. 13), above the engagement grooves 87, 87 (the upper part of FIG. 13).

Accordingly, by assembling the cover member 57 and the seal move-through member main body 55, the seal move-through member 53 is constituted. At that time, the engagement projections 65, 65 of the seal move-through member main body 55 are engaged with the engagement grooves 87, 87 of the cover member 57, and the engagement projection 69 of the seal move-through member main body 55 is engaged with the engagement groove 85 of the cover member 57. Further, the surfaces at the rear of the stoppers 67, 67 (the surfaces on the left side of FIG. 11) of the seal move-through member main body 55, become in contact with the surfaces of the cutouts 89, 89 facing forward (the surfaces facing to the right of FIG. 13), and therefore the cover member 57 and the seal move-through member main body 55 are integrated under a predetermined positional relation, so as to constitute the seal move-through member 53.

Moreover, when the seal move-through member 53 is constituted as discussed above, a cover section 91 is constituted by the cover member 57 and the bottom section 59 of the seal move-through member main body 55. As illustrated in FIG. 7 (b), the cover section 91 covers an expanded opening of the seal section 45 (shown by a reference sign "C" in FIG. 7), which has been moved through by the bow-shaped move-through section 75, from the side facing the mounting surface 8 (the lower side of FIG. 7 (b)).

For reference, where the seal move-through member main body 55 can be formed without providing the opening 61, the cover section 91 can be constituted only by the bottom section 59 of the seal move-through member main body 55, and therefore the cover member 57 will not be required.

On the basis of the structure as discussed above, the operation thereof will be explained.

First, the fundamental operation of the actuator will be explained.

The unillustrated motor installed in the inside of the motor cover 15 rotates the ball screw 27, whereby the ball nut 29 screwed into the ball screw 27, and further the slider 31, is moved in the rightward/leftward direction of FIG. 2.

For reference, any unillustrated carrying articles (for example, various instruments, etc.) are placed and fixed on the slider 31, and the carrying articles are moved arbitrarily while the slider 31 moves in the rightward/leftward direction of FIG. 2.

Moreover, the opening 9 is disposed on the side of the housing 3 facing the mounting surface 8, and since the side of the actuator 1 facing the working space (the upper part of FIG. 2) is closed, the intrusion of foreign articles from the side facing the working space into the inside of the housing 3, and the flow-out of wear debris, caused in the inside of the housing 3, to the side facing the working space, are prevented.

Moreover, with the parts of the slider 31 disposed to be projecting to the outside of the housing 3, namely, with the bottom section 31c and the table 31d, the expanded opening (shown by the reference sign "C" in FIG. 7) is prevented from the intrusion of foreign articles into the inside of the housing 3, and from the flow-out of foreign articles such as wear debris, caused in the inside of the housing 3, to the side facing the working space.

Moreover, the lid 11 is disposed at the opening 9, and the seal sections 45, 45 are disposed, respectively, at the both gaps 13, 13 on the both sides of the lid 11. With these seal sections 45, 45, the intrusion of foreign articles into the inside of the housing 3, and the flow-out of wear debris, caused in the inside of the housing 3, are surely prevented.

Next, the operation of the seal section 45 and the seal move-through member 53 will be explained in detail with reference to FIG. 2 and FIG. 5 through FIG. 7.

For example, when the slider 31 moves in the rightward direction of FIG. 2, as illustrated in FIG. 5 and FIG. 7, the pair of seal members 39, 39' is moved through by the pair of bow-shaped move-through sections 75, 75 of the seal move-through members 53, 53, respectively disposed at the front end thereof in the movement direction (the rightward direction of FIG. 2, and the downward direction of FIG. 7 (a)). With this move-through operation of these bow-shaped move-through sections 75, 75, the expanded opening (shown by the reference sign "C" in FIG. 7) is generated, from the part in front of the bow-shape move-through section 75, to the both right and left sides of the front end of the bow-shaped move-through sections 75.

In the case of the present embodiment, since the opening restriction sections 71, 71 are disposed on the both right and left sides of the bow-shaped move-through section 75, the opening of the pair of seal members 39, 39', which has been moved through, is restricted not to be wider. That is, with the opening restriction sections 71, 71, the size of the expanded opening C along the move-through direction (the movement direction of the slider 31) is restricted, to be within the area covered by the cover section 91 of the seal move-through member 53.

For reference, without the opening restriction sections 71, 71, the expanded opening C will exceed the area of the seal move-through member 53, and will be further expanded to the front of the movement direction.

Moreover, as illustrated in FIG. 7 (b), in regard to the expanded opening C, since the side thereof facing the mounting surface 8 (the lower side of FIG. 7 (*b*)) is closed by the cover section 91, the intrusion of foreign articles into the inside of the housing 3, and the flow-out of foreign articles such as wear debris, caused in the inside of the housing 3, are prevented.

Moreover, the front end of the bow-shaped move-through section 75 is positioned above the expanded opening C as seen in FIG. 7 (*b*), and accordingly, the intrusion of foreign articles into the inside of the housing 3, and the flow-out of foreign articles such as wear debris, caused in the inside of the housing 3, are also prevented.

For reference, the direction shown by an arrow B in FIG. 2 and FIG. 7 explains the movement direction of the slider 31.

Moreover, in the case of the present embodiment, the seal guides 63, 63 are disposed on the both sides of the seal move-through member 53 in the width direction (the both right and left sides of FIG. 7 (*a*)). With these seal guides 63, 63, the pair of seal members 39, 39', which has been moved through, is restricted not to be apart from each other for more than a predetermined distance, on the rear side of the bow-shaped move-through section 75 (the upper part of FIG. 7 (*a*)). The same is also applied to the seal move-through member 53 disposed at the rear end of the movement direction. Consequently, with the synergy of elastic return force of the pair of seal members 39, 39', the pair of seal members 39, 39', which has been moved through, becomes in tight contact with the slider main body 31*a*, in the part from the front end in the movement direction (the right end of FIG. 2) to the rear end in the movement direction (the left end of FIG. 2) of the slider 31. This also enables the prevention of foreign articles from intruding into the inside of the housing 3, and also the prevention of wear debris, caused in the inside of the housing 3, from flowing out.

Moreover, in regard to the rear end of the slider 31 in the movement direction (the left end of FIG. 2), when the slider 31 and the move-through member 53 pass by, the pair of seal members 39, 39' elastically returns in the closing directions to each other by their own elastic return forces, and the top end section 49 of the seal member 39 engages with the upper engagement projection 47' of the seal member 39', and returns to the state in which the desired sealing function is exhibited. Therefore, in regard to the both sides of the slider 31 in the movement direction, the pair of seal members 39, 39' is surely engaged with each other.

For reference, in regard to the rear end of the slider 31 in the movement direction (the left side of FIG. 2), it is needless to say that the size of the expanded opening formed by the seal members 39, 39' is also restricted by the opening restriction sections 71, 71.

Next, the effect of the actuator 1 according to the present embodiment will be explained.

First, the seal section 45 is constituted by engagement of the top end sections of the seal members 39, 39' with each other, and accordingly, the intrusion of foreign articles such as dust and waterdrop into the inside of the housing 3, and the flow-out of wear debris, etc., to the outside, caused in the inside of the housing 3, via the gaps 13, 13, are prevented effectively.

Moreover, as illustrated in FIG. 3, the seal move-through members 53, 53, 53, 53 are disposed at the both ends of the slider 31 in the movement direction, and as illustrated in FIG. 7 (*a*), the opening restriction sections 71, 71 are disposed at the seal move-through member 53, and accordingly, the amount of opening of the pair of seal members 39, 39', and further the size of the expanded opening C, can be minimized. Since the size of the expanded opening C is minimized, the intrusion of foreign articles such as dust and waterdrop into the inside of the housing 3 can be surely prevented, and at the same time, the flow-out of the wear debris, etc., from the inside of the housing 3 can be surely prevented.

Moreover, as illustrated in FIG. 7 (*b*), the bow-shaped move-through section 75 of the seal move-through member 53 is in the shape of bow of a ship. That is, with reference to FIG. 7 (*b*), as the part of the bow-shaped move-through section 75 goes upward, the bulging volume thereof toward the right side of FIG. 7 (*b*) becomes larger. Consequently, since the bow-shaped move-through section 75 is positioned above the expanded opening C (the upper part of FIG. 7 (*b*)), even when foreign articles intrude into the expanded opening C, the foreign articles can be prevented from intruding into the inside of the hosing 3, and at the same time, the flow-out of foreign articles from the inside of the housing 3 can also be prevented.

Moreover, because of the shape of bow of a ship, the bow-shaped move-through section 75 gradually moves through so as to push apart the seal section 45 from the inner part, and therefore the slider 31 can be moved by moving through the seal section 45 smoothly.

Moreover, the seal guides 63, 63 are formed in the seal move-through member 53, whereby the seal members 39, 39' are restricted not to be apart from each other for more than a predetermined distance, and therefore, with the synergy of elastic return force of the seal members 39, 39', the seal members 39, 39', which have been moved through, become in tight contact with the slider main body 31*a*, in the part from the front end in the movement direction (the right end of FIG. 2) to the rear end in the movement direction (the left end of FIG. 2) of the slider 31. Accordingly, the size of the expanded opening C can also be minimized, and further, the intrusion of foreign articles such as dust and waterdrop into the inside of the housing 3, and also the flow-out of foreign articles such as wear debris from the inside of the housing 3, can surely be prevented.

Moreover, since the seal move-through members 53, 53, 53, 53 are provided with the cover section 91, the intrusion of foreign articles such as dust and waterdrop into the inside of the housing 3, and the flow-out of foreign articles from the inside of the housing 3, via the expanded opening C, can surely be prevented.

Moreover, with the parts of the slider 31, which are disposed to be projecting toward the outside of the housing 3, the intrusion of foreign articles into the inside of the housing 3, and the flow-out of foreign articles from the outside of the housing 3, via the expanded opening C, can be prevented.

Moreover, since the seal member 39 and the seal member 39' are made of the same material, the same structural parts can be used to constitute the seal section 45.

Moreover, since the seal section 45 has one-stage structure of one pair, namely the seal member 39 and the seal member 39', the structure thereof is simple, and a desired sealing effect can be obtained by this simple structure, and therefore the downsizing and cost reduction can be accomplished easily.

Further, the side facing the working space is closed completely, and the only opening parts, namely the gaps 13, 13, is facing the side facing the mounting surface 8 (the lower side of FIG. 2). Therefore, the intrusion of foreign articles, such as dust and waterdrop, from the side facing the working space into the inside of the housing 3, and the flow-out of wear debris, etc., caused in the inside of the housing 3, to the side facing the working space, can be prevented effectively.

Figure 14:
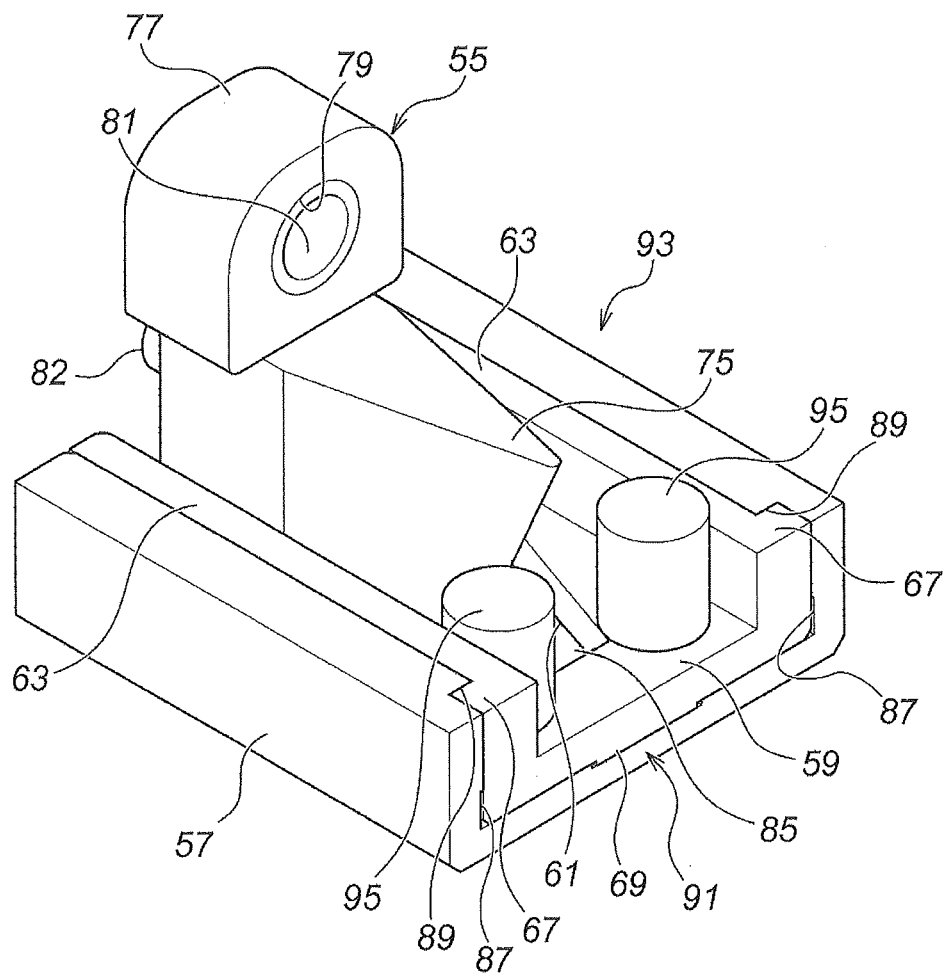
FIG. 14 A perspective view showing the seal move-through member used for the actuator according to a second embodiment of the present invention.

Next, a second embodiment of the present invention will be explained with reference to FIG. 14. The actuator according to this embodiment substantially has the same structure as the actuator 1 of the first embodiment discussed above, but the structure of the seal move-through member is partially different. That is, as illustrated in FIG. 14, a seal move-through member 93 used for the actuator according to the present embodiment, has opening restriction sections 95, 95, respectively formed substantially in a cylindrical shape.

For reference, the other structure is the same as that of the first embodiment discussed above, and the same reference numerals are allotted to the same structural parts in the drawings, and the explanation thereof will be omitted.

The actuator according to the present embodiment exhibits the same functions and effects as those of the actuator 1, which have been discussed in the first embodiment.

The present invention is not limited to the first and second embodiments as discussed above.

For example, in the cases of the first and second embodiments, the structure is exemplified in which, the gaps are formed on the both right and left sides of the lid, and the seal sections 45 are disposed therein one by one, respectively. However, the present invention is not limited thereto, and one seal section, or three seal sections or more, can be envisaged.

For reference, the number of the seal move-through members 53 varies corresponding to the variation of the number of the seal sections.

Further, the shape, etc., of the seal move-through member 53 is not limited to those of the first embodiment and the second embodiment.

Further, the material, size, etc., of each structural member is not limited to those of the first embodiment and the second embodiment.

Further, in the cases of the first and second embodiments, the structure is exemplified, in which the seal section is constituted by disposing the pair of seal members facing each other. However, it is also envisaged that the seal section is constituted by multi-staged, for example, two-staged pair of seal members. In such a case, correspondingly, alternative structures are envisaged, namely, one is to change the structure of the seal move-through members (for example, multi-staging of the opening restriction sections), and the other is to remain the seal move-through members without any change. In this case, although the structure will become complicated and larger as the number of stages increases, the same effect of opening restriction can be obtained.

Further, the structures shown in the drawings are for the exemplification purpose only.

INDUSTRIAL APPLICABILITY

The present invention relates, for example, to the actuator having dust-proof and drip-proof structures, and more particularly, relates to that having the structure to move the slider by moving through the seal members, in which, by providing the opening restriction sections to restrict the amount of opening of the seal members, the sealing performance can be improved. For example, the present invention is suitable for an actuator used for an apparatus of food factory.

EXPLANATION OF REFERENCE NUMERALS AND SIGNS 1 actuator
3 housing
8 mounting surface
9 opening
11 lid
13 gap
27 ball screw (a part of drive means)
29 ball nut (a part of drive means)
31 slider
39 seal member
39' seal member
45 seal section
53 seal move-through member
63 seal guide
75 bow-shaped move-through section (move-through section)
91 cover section
71 opening restriction section
73 opening restriction surface
93 seal move-through member
95 opening restriction section

The invention claimed is:
1. An actuator, comprising:
a housing which is provided with an opening formed to be elongating in a longitudinal direction;
a slider which is installed so as to be movable in the longitudinal direction of the housing along the opening;
drive means which is installed in the housing and which moves the slider in the longitudinal direction of the housing;
at least a pair of seal members, each of which is disposed at a marginal section of the opening of the housing facing to each other and which exhibits dust-proof and drip-proof functions by engaging with each other; and
seal move-through members which are mounted to both sides of the slider in a movement direction thereof and which move through the pair of seal members,
wherein each of the seal move-through members comprises:
a move-through section which pushes apart the pair of seal members in a direction in which the pair of seal members is separated;
a cover section which covers an expanded opening formed between the pair of seal members when the pair of seal members is pushed apart by the move-through section; and
an opening restriction section, which is disposed on a top end side of the move-through section so as to be positioned inward of a top end of the cover section, and which, when the pair of seal members is pushed apart from each other by the move-through section, restricts an amount of an opening between the pair of seal members, and further restricts a size of the expanded opening.
2. The actuator as claimed in claim 1, wherein a pair of opening restriction surfaces facing each other is formed in the opening restriction section, and a distance of the pair of opening restriction surfaces becomes closer to each other as the pair of opening restriction surfaces goes closer to a front end of the move-through section.
3. The actuator as claimed in claim 2, wherein a pair of seal guides, which guides the pair of seal members, is disposed at the cover section.
4. The actuator as claimed in claim 3, wherein the front end of the move-through section is in a shape of a bow of a ship.

5. The actuator as claimed in claim 4, wherein a side of the housing facing a working space is closed, and another side of the housing facing a mounting surface includes the opening.

6. The actuator as claimed in claim 5, wherein the slider is projectingly disposed so as to straddle over the housing.

7. The actuator as claimed in claim 6, wherein a lid is provided at a center of the opening of the housing.

8. The actuator as claimed in claim 7, wherein gaps are formed, respectively, between both right and left sides of the lid and the housing, and the pair of seal members is disposed in respective gaps.

9. The actuator as claimed in claim 1, wherein the expanded opening is not exposed from the cover section.

10. The actuator as claimed in claim 1, wherein the expanded opening is located in front of the move-through section.

11. The actuator as claimed in claim 1, wherein the size of the expanded opening along the longitudinal direction of the housing is restricted to be within an area covered by the cover section of the seal move-through members.

12. The actuator as claimed in claim 1, wherein the pair of seal members is in contact with the slider in a part from a front end of the slider to a rear end of the slider in the longitudinal direction of the housing.

* * * * *